United States Patent [19]

Morris

[11] 4,207,812

[45] Jun. 17, 1980

[54] APPARATUS FOR DIE STAMPING BATTERY CONTAINER CAN ENDS

[75] Inventor: Jesse L. Morris, Archer, Fla.

[73] Assignee: General Electric Company, Gainesville, Fla.

[21] Appl. No.: 882,317

[22] Filed: Mar. 1, 1978

[51] Int. Cl.² ............................................. B41F 17/16
[52] U.S. Cl. ......................................... 101/4; 173/119
[58] Field of Search ........................ 101/3 R, 4, 9–11, 101/3 S, 41–44; 173/119, 120, 121

[56] References Cited

U.S. PATENT DOCUMENTS

| | | | |
|---|---|---|---|
| 2,201,302 | 5/1940 | Rowe | 101/41 X |
| 2,427,358 | 9/1947 | Kovach | 101/3 R |
| 2,455,270 | 11/1948 | Ravella | 173/120 |
| 2,832,281 | 4/1958 | Wilcox | 101/4 |
| 3,071,994 | 1/1963 | Swenson | 173/121 |
| 3,362,326 | 1/1968 | Delpo et al. | 101/316 |
| 3,385,380 | 5/1968 | Waller | 173/119 |
| 4,077,319 | 3/1978 | Edmisten | 101/41 |
| 4,127,063 | 11/1978 | Peterson et al. | 101/3 R |

Primary Examiner—Clifford D. Crowder

[57] ABSTRACT

An apparatus for die stamping the end of battery cell containers which includes a die holder, a hollow tube for engaging and guiding the container end with the die, a hammer for impacting the end of the guided and engaged container end with the die and an air cylinder for first engaging the hollow tube with the container and for engaging the container end with the die and, when the container end is so engaged, for actuating the hammer for impacting the container end.

6 Claims, 3 Drawing Figures

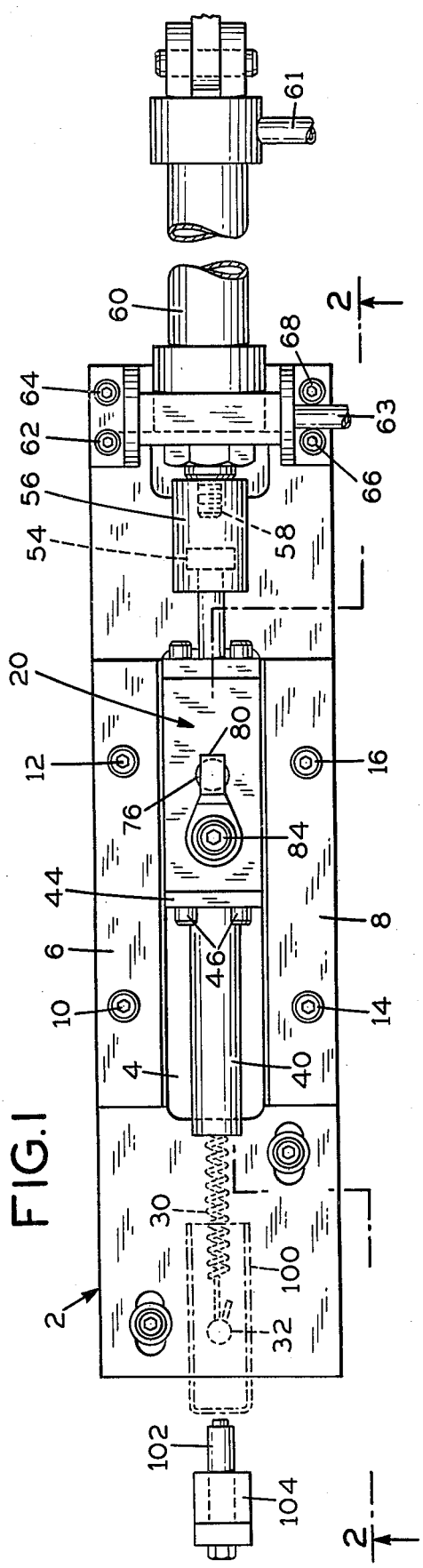
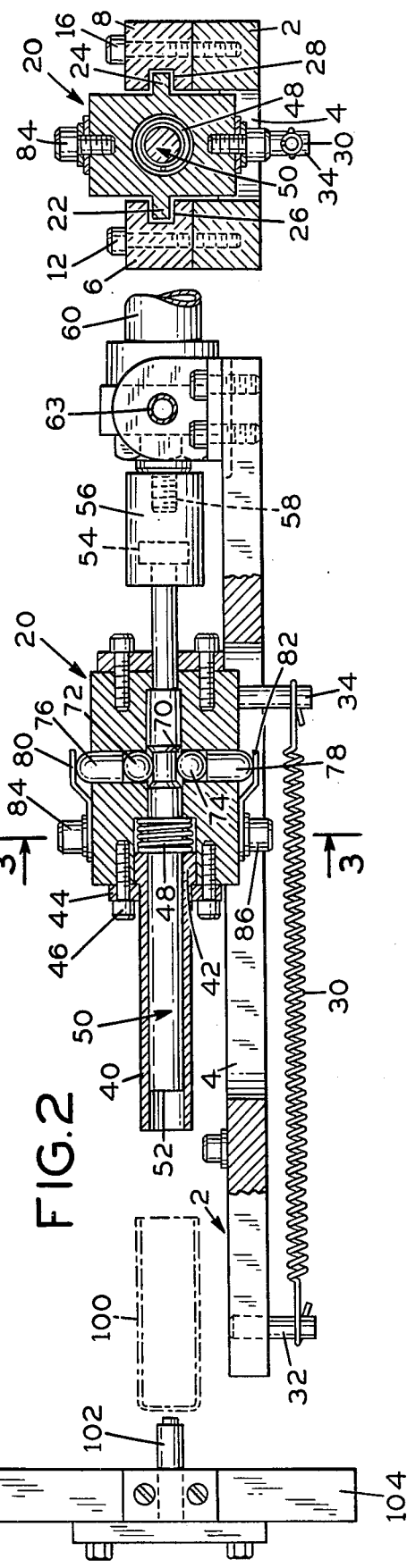

APPARATUS FOR DIE STAMPING BATTERY CONTAINER CAN ENDS

This invention relates to apparatus for stamping the end of containers and, more particularly, to apparatus for die stamping the end of a battery cell container.

During the manufacture of battery cells, such as for example, nickel-cadmium battery cells, it is often desirable to mark the cell during manufacture so that the cell might later be identified. Thus, the date the cell was manufactured, the work shift such manufacture took place, the machine or machines upon which manufactured, as well as a variety of other information might be ascertained. Because of the handling of the cell during and after manufacture, it is desirable that such marking be applied to the cell in a manner such that the marking will not be removed obliterated, altered, covered over, etc. during manufacture and handling. Furthermore, such marking must not interfere with the manufacturing process or the functioning of the cell once manufactured.

One means for marking which has been found to be particularly suited to battery cell manufacture is die stamping of identification on the bottom of the cell casing as the cell is being produced. This is accomplished after the casing is formed and before the cell is assembled and may be in the form of die stamped numbers, letters, symbols or combinations thereof.

The instant invention is concerned with an apparatus for die stamping the bottom wall of a container, especially a container to be used as a casing for a battery cell. The apparatus includes a guide for holding and aligning the container bottom wall with the die and a hammer for impacting such bottom wall with the die while the container is held and in alignment. The apparatus includes operating means for actuating the guide and hammer.

The instant invention will be more fully described and will be better understood from the following description of a preferred embodiment taken with the appended drawings in which FIG. 1 is a top plan view of the apparatus of the instant invention;

FIG. 2 is a side elevational view, partly in section at line A—A FIG. 1, of the apparatus of FIG. 1; and FIG. 3 is an end view, in section, of the apparatus of FIGS. 1 and 2.

Referring to the drawings, the apparatus includes base 2 having longitudinal slot 4 and guideway 6,8, mounted thereon and fixed thereto by bolts 10,12,14,16, respectively. A hammer actuator, generally designated 20, having outwardly projecting guides 22,24, mounted for movement, respectively, in slots 26,28 of guideways 6,8 parallel to the plane of base 2 and parallel to slot 4. For purposes more apparent later herein, hammer actuator 20 is biased toward its rest or inoperative position by compression spring 30, fixed at one of its ends to post 32 mounted on base 2 and, at its other end, to post 34 fixed to hammer actuator 20.

Container alignment guide 40 is in the form of a hollow shaft having, at its inner end, an enlarged shoulder portion 42 and is mounted in hammer actuator 20 for sliding movement therein by plate 44 fixed to the forward end of actuator 20 by cap screws 46. Spring 48 in actuator 20 at the inner end of enlarged shoulder portion 42 of alignment guide 40 biases guide 40 outwardly of actuator 20, engaging the forward end of shoulder portion 42 with plate 44.

Hammer 50 extends axially through actuator 20 and axially through alignment guide 40. In the rest position, as shown in the drawings, the forward end 52 of hammer 50 is retracted into the forward end of alignment guide 40. At its rear end 54, hammer 50 is coupled by coupling 56 to the forward end of piston rod 58 of air cylinder 60. Cylinder 60 is mounted by cap screws 62, 64, 66, 68 on base 22. Intermediate its ends 52, 54, hammer 50 has a groove 70 extending circumferentially around hammer 50. Detents 72, 74 are pressed by pins 76, 78 into groove 70. Compression springs 80,82, fixed to actuator 20 by cap screws 84, 86, urge pins 76,78 inwardly and urge ball bearings 72,74 into groove 70 of hammer 50.

In the operation of the apparatus of the instant invention, air under pressure is applied to cylinder 60 through inlet port 61 causing piston rod 58 to advance, thus advancing hammer 50, actuator 20 and alignment guide 40 as a single unit toward the left in FIG. 2. The leading end of guide 40 then enters can 100 and contacts the inside wall at the bottom of can 100. Continued movement of the cylinder piston causes the guide 40 to move the outside wall at the bottom of can 100 into contact with die 102, which is fixed to support 104.

With the bottom of can 100 in contact with die 102 and the leading end of guide 40 in contact with the inside of the bottom can wall, spring 48 is compressed and the can bottom is held in firm contact and aligned with die 102. Air pressure in air cylinder 60 now builds up.

When the air pressure in cylinder 60 applied through piston rod 58 and coupling 56 to hammer 50 exceeds the spring force of springs 80,82 applied to detents 72,74, the detents are forced outwardly, hammer 50 is released and hammer 50 is accelerated by the cylinder air pressure and the compression force in spring 48 axially of guide 40 and hammer 50 and strikes the inner side of the bottom wall of can 100. The striking force applied to the bottom wall of can 100 by hammer 50 causes the die at the outer side of the wall to imprint or stamp the outer wall. Springs 30,48 hold can 100 in contact with die 102 while hammer 50 is being released, accelerated and is imprinting or stamping the end of the can.

After the end of the can is imprinted or stamped, the air in cylinder 60 is reversed, withdrawing guide 40 and hammer 50 from inside of the can and re-cocking hammer 50 on detents 72,74. The stamped can is removed and a fresh can is positioned over the die. The operation is then repeated.

In the operation of the instant apparatus, the can to be die stamped is guided and held in alignment with the die and the hammer is actuated to imprint or stamp the die into the can bottom wall in a continuous operation. Thus, the can end is guided and aligned with the die and the hammer actuated without interruption. The die and can end are aligned and this alignment is maintained until die stamping is completed and the hammer and guide are withdrawn. Thus, a uniform marking on the can bottom wall is attained and cocking, mis-alignment and uneven marking is avoided. This is of particular importance in the marking of battery cell containers because uneven marking, and the thinning and weakening at points where the marking is deepened can adversely affect the performance and life of the cell.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for stamping the end of a container, said apparatus comprising a die, means for guiding and aligning the end of a container with said die, impact means in axial alignment with said guiding and aligning means for delivering an impact to said container after said container is engaged with said die for causing said die to mark said container end and means for moving said guiding and aligning means with said container against said die and for causing said impact means to impact said container after said container is in engagement with said die.

2. An apparatus, as recited in claim 1, in which said means for moving said guiding and aligning means with said container and for causing said impact means to impact said container includes an air cylinder.

3. An apparatus, as recited in claim 2, in which said means for moving said guiding and aligning means with said container and for causing said impact means to impact said container further includes spring means and means for compressing said spring means after said guiding and aligning means engages said container with said die and before said impact means impacts said container with said die.

4. An apparatus, as recited in claim 3, in which said spring means includes spring held ball bearings.

5. An apparatus, as recited in claim 4, in which said means for guiding and aligning the end of a container with said die is a hollow shaft and said impact means for delivering an impact to said container extends in axial alignment with said guiding and aligning means through said hollow shaft.

6. An apparatus, as recited in claim 4 in which said means for compressing said spring means includes a recess in said impact means and springs for urging said ball bearings in said recess.

* * * * *